(12) United States Patent
Kajita et al.

(10) Patent No.: US 10,088,719 B2
(45) Date of Patent: Oct. 2, 2018

(54) IN-PLANE SWITCHING LIQUID CRYSTAL DISPLAY DEVICE THAT CAN ACHIEVE HOMOGENEOUS SHADING

(71) Applicant: Panasonic Liquid Crystal Display Co., Ltd., Himeji-shi, Hyogo (JP)

(72) Inventors: Daisuke Kajita, Hyogo (JP); Tsuyoshi Uchida, Hyogo (JP); Teruhisa Nakagawa, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/906,815

(22) Filed: Feb. 27, 2018

(65) Prior Publication Data

US 2018/0188617 A1  Jul. 5, 2018

Related U.S. Application Data

(62) Division of application No. 15/085,751, filed on Mar. 30, 2016, now Pat. No. 9,939,694.

(51) Int. Cl.
*G05D 1/02* (2006.01)
*G01C 21/34* (2006.01)
*G02F 1/1343* (2006.01)

(52) U.S. Cl.
CPC .... *G02F 1/134336* (2013.01); *G02F 1/13439* (2013.01); *G02F 2001/134345* (2013.01)

(58) Field of Classification Search
CPC ............ G01C 21/3484; G01C 21/3415; G08G 1/095; G08G 1/20; G05D 1/0291; G05D 2201/0213; G06Q 40/12
See application file for complete search history.

(56) References Cited

U.S. PATENT DOCUMENTS

| | | |
|---|---|---|
| 6,014,190 A | 1/2000 | Kim et al. |
| 7,499,115 B2 | 3/2009 | Kumagawa et al. |
| 9,709,866 B1 | 7/2017 | Sakakibara et al. |
| 2008/0186440 A1 | 8/2008 | Lim et al. |
| 2009/0295701 A1 | 12/2009 | Matsumoto et al. |
| 2010/0171892 A1 | 7/2010 | Lim et al. |
| 2010/0289786 A1 | 11/2010 | Tanaka et al. |
| 2011/0222016 A1 | 9/2011 | Kaneko et al. |

*Primary Examiner* — Tracie Y Green
(74) *Attorney, Agent, or Firm* — Hamre, Schumann, Mueller & Larson, P.C.

(57) ABSTRACT

A liquid crystal display device includes an arrangement of pixels, wherein each of the pixels includes at least three subpixels, wherein the second subpixel is a Red subpixel, in contrast to the traditional Red-Green-Blue subpixel configuration. Further, a signal line is disposed next to each of the subpixels, but a common line is disposed next to a subpixel which is not a Red subpixel. Thus, the second subpixel, which is a Red subpixel, has on both sides thereof signal lines, but lacks a common line next thereto.

5 Claims, 10 Drawing Sheets

IN-PLANE SWITCHING LIQUID CRYSTAL DISPLAY DEVICE THAT CAN ACHIEVE HOMOGENEOUS SHADING

FIELD

The present application relates to a liquid crystal display (LCD) device, such as for example, an in-plane switching (IPS) LCD device.

BACKGROUND

Generally, an IPS LCD device includes two substrates sandwiching a liquid crystal layer, having an arrangement of repeating pixels. Generally, a LCD display device has a plurality of pixels arranged in a repeating grid-like arrangement, wherein each pixel is defined by a group of individually addressable elements. Each of these elements is called a subpixel. Each subpixel represents a single color region. FIGS. 9 and 10 show a traditional IPS LCD device 100. FIG. 9 is a schematic sectional side view of pixels of the IPS LCD device 100. FIG. 10 is a schematic plan view of pixels of the IPS LCD device 100. The IPS LCD device 100 can have some areas that are brighter than other areas, or look of nonhomogeneous shading as a whole. This property is less than optimal.

SUMMARY

An improved LCD device disclosed herein can achieve homogeneous shading, wherein like elements are referred to with the same reference numerals and/or reference characters.

The areas of different brightness found in the traditional IPS LCD devices (e.g., see FIGS. 9 and 10) are unlikely to be found in the embodiments of the LCD device described herein. A pixel is defined to include at least three subpixels. In some embodiments, the three subpixels are a first color subpixel, a second color subpixel, and a third color subpixel. In some embodiments, the first color subpixel is a blue subpixel. In some embodiments, the first subpixel is a green subpixel. In some embodiments, the second subpixel is not a green subpixel. In some embodiments, the third subpixel is a green subpixel. In some embodiments, the third subpixel is a blue subpixel. In some embodiments, the first subpixel is not a red subpixel. A pixel can have four subpixels. The fourth subpixel can be a yellow subpixel (e.g., has a yellow color filter).

In some of the embodiments of the improved LCD device, the red subpixel is arranged to be the second subpixel of the at least three subpixels arranged along a defined direction. The terms, first, second, third, etc. are used herein to describe a sequential order of things. The term adjacent is used herein to describe things that are next to each other without another one of the same thing disposed between them. For example, the phrase, two adjacent wires means that there are two wires (i.e., first wire and second wire) without another wire of the same kind as the first and second wires between the two wires.

An embodiment of the improved LCD device includes a first substrate on a display surface side, a second substrate on a rear surface side, and a liquid crystal layer interposed between the first substrate and the second substrate, two adjacent common lines arranged along a first direction on the second substrate in plan view, a pixel including three or more subpixels arranged along a second direction, the three or more subpixels being interposed between two adjacent common lines in plan view, and four signal lines arranged along the first direction on the second substrate, wherein each of the signal lines is arranged adjacent to at least one of the subpixels in plan view.

In another embodiment of the LCD device, a second subpixel of the three or more subpixels is not adjacent to any of the two adjacent common lines in plan view. The second subpixel can be a red subpixel.

In another embodiment, the LCD device has at least one of the two adjacent common lines or the four signal lines made of or including copper.

Another embodiment of the LCD device has a first of the two adjacent common lines and a first of the four signal lines overlap each other in plan view, and the first of the two adjacent common lines and the first of the four signal lines are disposed adjacent to a first subpixel of the three or more subpixels.

Yet another embodiment of the LCD device has a second of the two adjacent common lines and a fourth of the four signal lines that overlap each other in plan view, and the second of the two adjacent common lines and the fourth of the four signal lines are disposed adjacent to a third subpixel of the three or more subpixels.

In yet another embodiment of the LCD device, a second of the signal lines is disposed between a first and a second subpixel of the three or more subpixels, and the second of the single lines does not overlap with the two adjacent common lines in plan view.

In another embodiment of the LCD device, a third of the signal lines is disposed between the second and a third subpixel of the three or more subpixels, and the third of the single lines does not overlap with the two adjacent common lines in plan view.

An embodiment of the LCD device includes a third common line arranged along the second direction connected to both of the two adjacent common lines.

An embodiment of the LCD device includes a first substrate on a display surface side, a second substrate on a rear surface side, a liquid crystal layer interposed between the first substrate and the second substrate, two adjacent copper common lines arranged along a first direction on the second substrate in plan view, a pixel including a red subpixel, a green subpixel, and a blue subpixel, wherein the red subpixel is arranged between the green subpixel and the blue subpixel along a second direction, and the red subpixel, the green subpixel, and the blue subpixel are interposed between two adjacent copper common lines, and four copper signal lines arranged along the first direction on the second substrate. Each of the four copper signal lines is arranged adjacent to at least one of the red subpixel, the green subpixel, and the blue subpixel in plan view, first of the two adjacent copper common lines overlaps a first of the four copper signal lines in plan view, and second of the two adjacent copper common lines overlaps a fourth of the four copper signal lines in plan view.

In another embodiment of the LCD device, the red subpixel is not adjacent to one of the two adjacent copper common lines.

An embodiment of the LCD device includes a first substrate on a display surface side, a second substrate on a rear surface side, a liquid crystal layer interposed between the first substrate and the second substrate, three common lines arranged along a first direction on the second substrate, a pixel including a red subpixel, a green subpixel, a blue subpixel, and another subpixel, wherein the red subpixel is arranged between the green subpixel and the blue subpixel along a second direction, and the red subpixel, the green subpixel, and the blue subpixel are interposed between first and second of the three common lines, the another subpixel is interposed between second and third of the three common lines, and five signal lines arranged along the first direction on the second substrate. Each of the five signal lines is arranged adjacent to at least one of the red subpixel, the green subpixel, the blue subpixel, and the another subpixel in plan view, first of the three common lines overlaps a first of the five signal lines in plan view, second of the three common lines overlaps a fourth of the five signal lines in plan view, third of the three common lines overlaps a fifth of the five signal lines in plan view, and at least one of the three common lines or the five signal lines includes copper. The red subpixel can be not adjacent to any of the three common lines in plan view.

In an embodiment of the LCD device, the signal lines are closer to the liquid crystal layer than the common lines.

In another embodiment of the LCD device, the common lines are closer to the liquid crystal layer than the signal lines.

DETAILED DESCRIPTION

Figure 9:
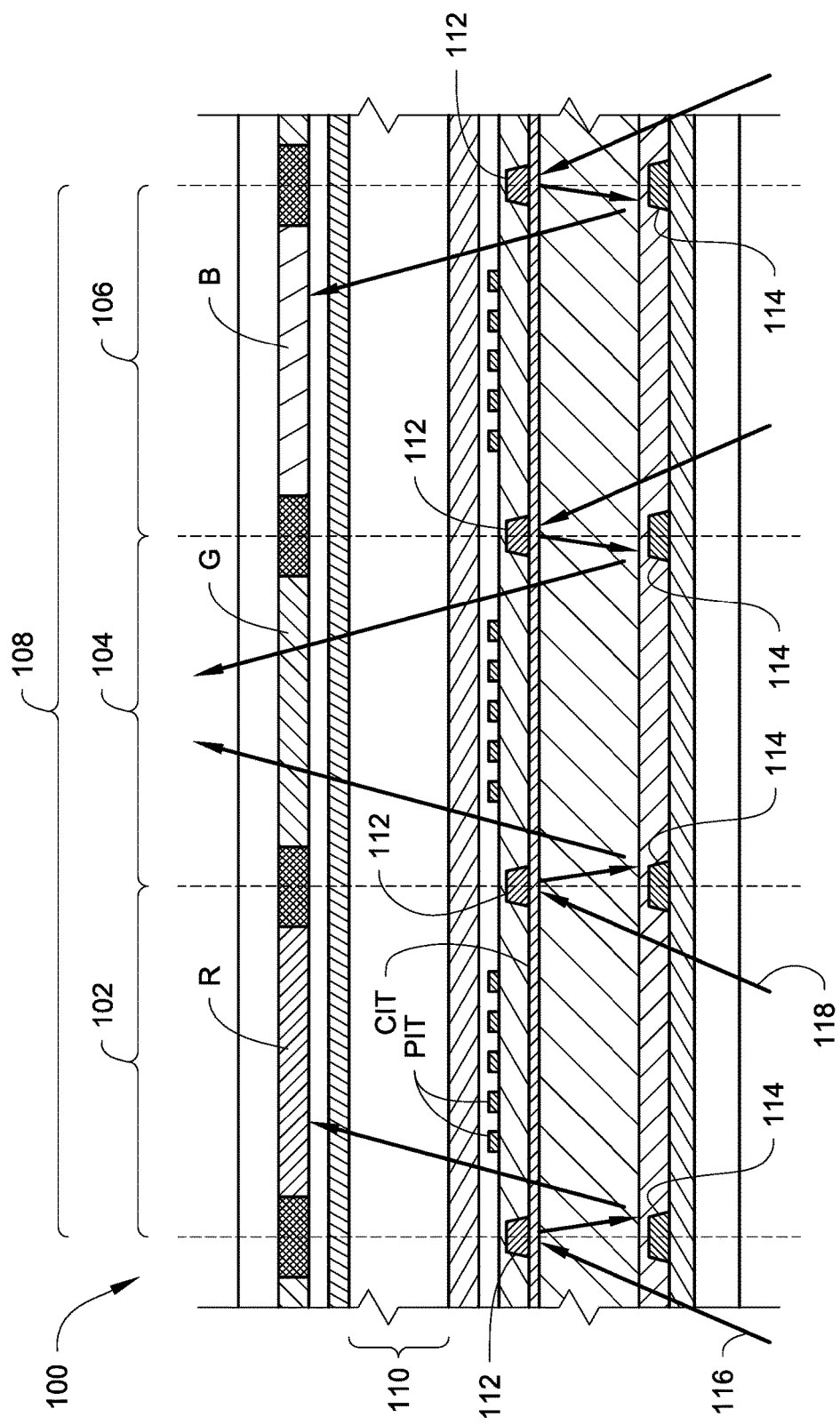
FIG. 9 is a schematic sectional side view of subpixels of a traditional IPS LCD device.
Figure 10:
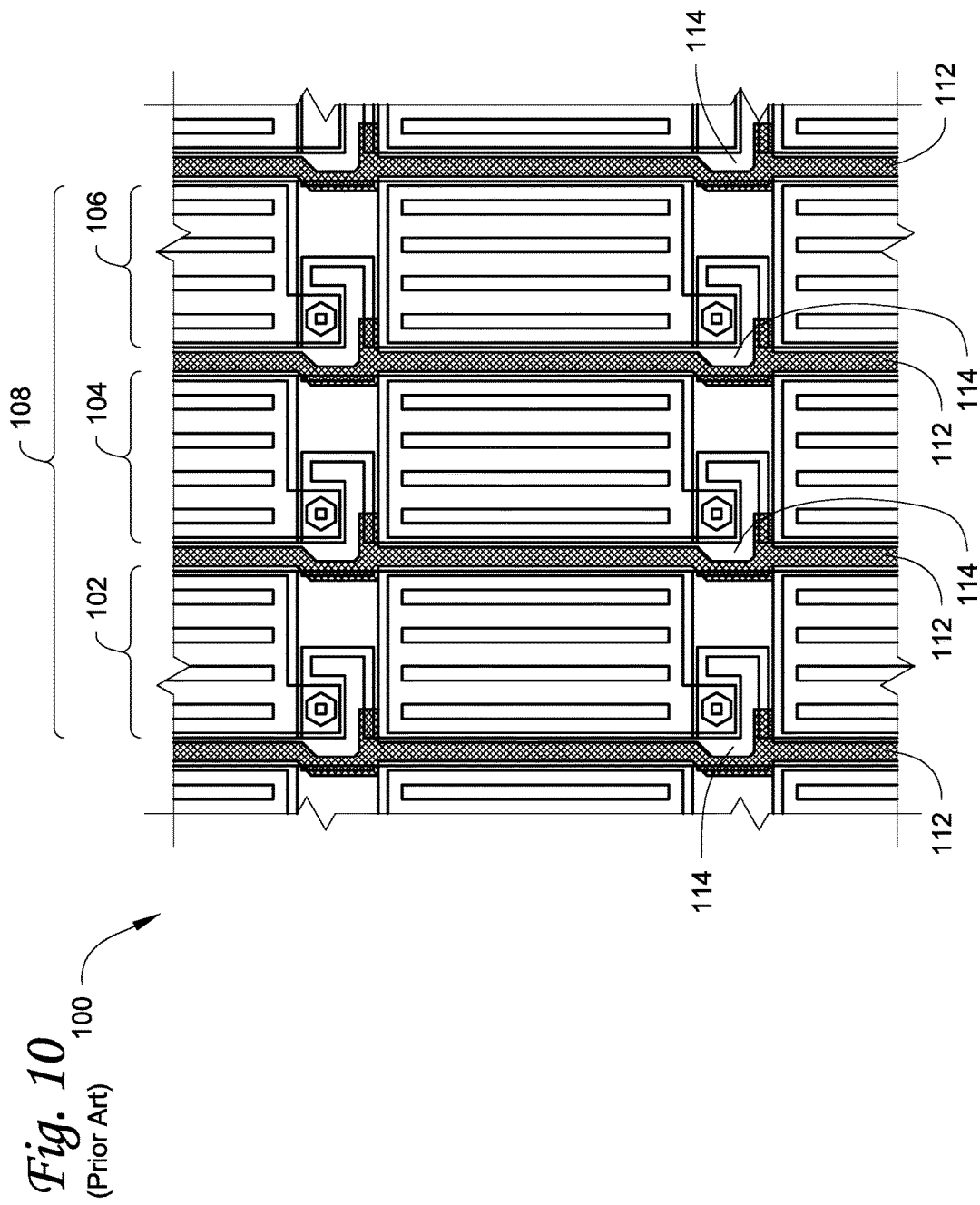
FIG. 10 is a schematic plan view of subpixels of the IPS LCD device shown in FIG. 9.

In FIGS. 9 and 10, the IPS LCD device 100 has a repeating arrangement of three subpixels, a red (R) subpixel 102, a green (G) subpixel 104, and a blue (B) subpixel 106. Each of the subpixels 102, 104, 106 is identified by a color filter (e.g., R for red, G for green, and B for blue). These three subpixels 102, 104, 106 define a pixel 108. The pixels 108 are arranged along a horizontal direction in a repeating grid-like arrangement.

Each subpixel 102, 104, 106 includes a pixel electrode and a common electrode. The common electrode carries a common voltage to each of the subpixels 102, 104, 106. The pixel electrode can be individually controlled to have a different voltage from the common electrode. The voltage difference between the pixel electrode and the common electrode creates an electric field for the respective subpixel. This electric field (a.k.a. transverse electric field) is substantially parallel to the substrate in the liquid crystal layer 110, and thus, the electric field drives the liquid crystals in the respective subpixel to control the transmission of light through the respective subpixel in the LCD device 100.

Arranged next to and/or between each of the adjacent subpixels 102, 104, 106 are common lines 112 (e.g., copper wires for carrying the common voltage) and signal lines 114 (e.g., copper wires for generating a voltage difference between the common electrode and the pixel electrode for each of the subpixels). The common lines 112 and signal lines 114 are arranged to overlap along a plan view as shown in FIG. 10. FIG. 9 shows the common lines 112 disposed closer to the liquid crystal layer 110 than the signal lines 114.

It has been found that the configuration described with respect to FIGS. 9 and 10 can lead to nonhomogeneous shading regions in the IPS LCD device 100.

It has been discovered that light transmission 116 from the backlight can be blocked by one of the common lines 112 for some subpixels. That is, the common line 112 reflects the light 116 back (i.e., away from the liquid crystal layer, or towards the rear of the IPS LCD device 100).

However, other light transmissions 118 from the backlight can be reflected by the common line 112 and then the light 118 can be reflected again by the respectively overlapping signal line 114, and this can lead the light 118 to be directed towards the liquid crystal layer. Because the common line 112 and the signal line 114 are generally made of copper, when the light 118 is reflected towards the liquid crystal layer in the red subpixel 102 region the light 118 can transmit through the red filter R and leak out to the front of the IPS LCD device 100.

That is, backlight, which is generally white light, can be reflected by a wire made of copper and the reflected light is a reddish light that includes the red spectrum as the main element (e.g., wavelength). The reddish light is blocked by a non-red color filter. For example, the light 116 can be reflected by an overlapping signal line 114 and the non-red color filter (e.g., Blue (B), Green (G), Yellow (Y), etc.) can block the light 116 from being transmitted through the non-red color filter. However, the reddish light passes through the red color filter R.

The alignments between the common lines 112 and the signal lines 114 differ depending on the area in a display region. The property of passing through the red color filter by the reddish light is nonhomogeneous due to unevenness of the display region caused during a manufacturing process of the display. Thus, the light blockage (e.g., light 116) and light leakage (e.g., light 118) can occur differently in regions of the IPS LCD device 100. That is, the IPS LCD device 100 can have some areas that are brighter than other areas, or look of nonhomogeneous shading as a whole. This property is less than optimal.

Figure 1:
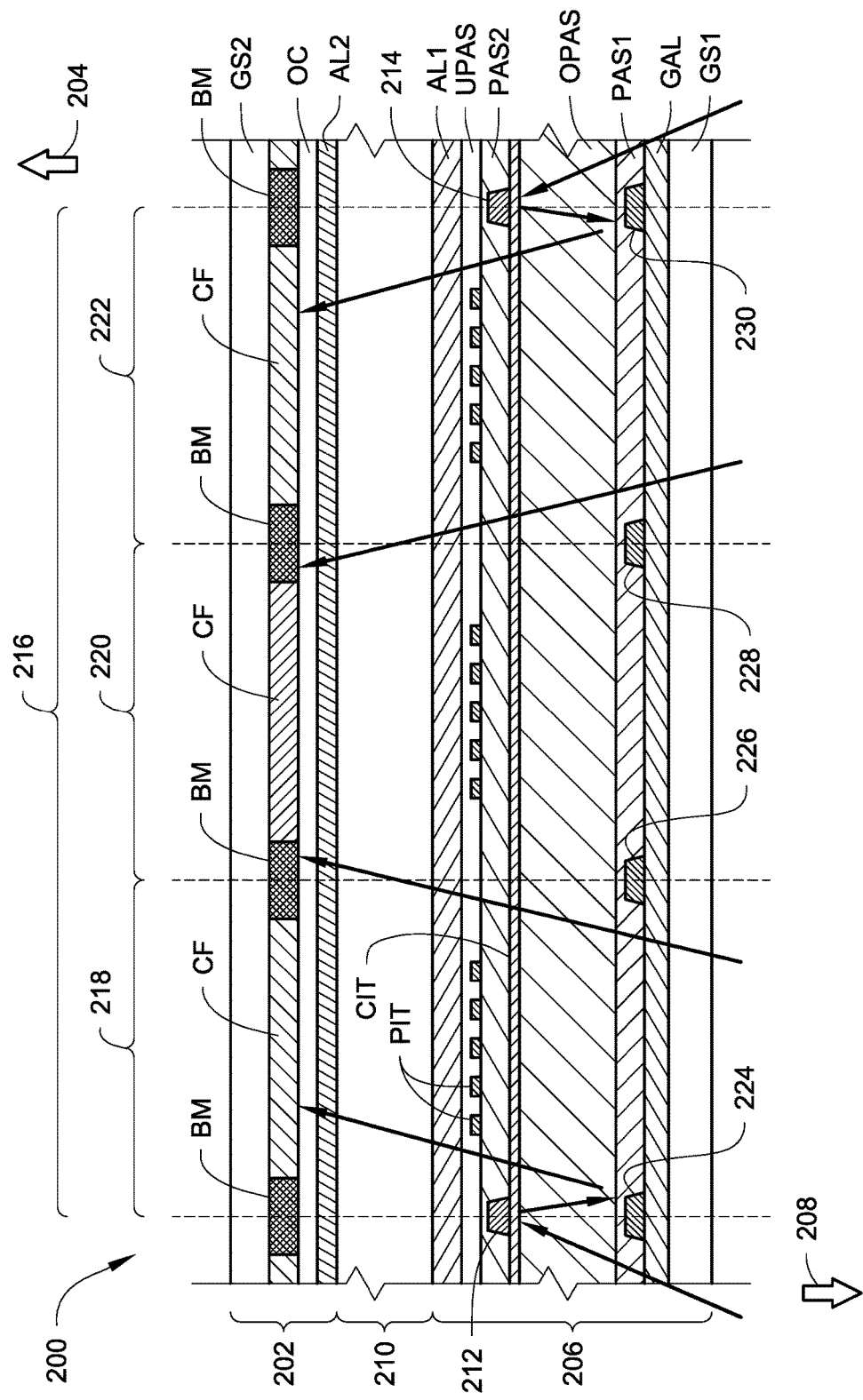
FIG. 1 is a schematic sectional side view of subpixels of a LCD device according to an embodiment.

FIG. 1 is a schematic sectional side view of pixels of a LCD device 200 according to an embodiment. An embodiment of the LCD device 200 is an IPS LCD device. The LCD device 200 includes a first substrate 202 on a display surface side 204, a second substrate 206 on a rear surface side 208, and a liquid crystal layer 210 interposed between the first substrate 202 and the second substrate 206.

The first substrate 202 is a substrate assembly including a black matrix BM, a color filter CF, an overcoat layer OC and a second alignment layer AL2 stacked on a second glass substrate GS2.

The LCD device 200 includes at least two adjacent common lines 212, 214 arranged along a first direction on the second substrate 206. That is, the second substrate 206 is a substrate assembly including a gate line (not shown), a gate insulator film GAL, a thin film transistor (TFT) including a semiconductor layer, a drain electrode and a source electrode, a first passivation film PAS1, an organic passivation layer OPAS, a common electrode CIT, common lines 212, 214, a second passivation film PAS2, a pixel electrode PIT, an upper passive layer UPAS, and a first alignment layer AL1 being stacked on a first glass substrate GS1.

The LCD device 200 includes a repeating arrangement of pixels 216. Each of the pixels 216 includes at least three subpixels, a first subpixel 218, a second subpixel 220, and a third subpixel 222. Each of the subpixels 218, 220, 222 can be identified a respective color filter. For example, the first subpixel 218 can be either blue or green. The second subpixel 220 is red. For example, the third subpixel 222 can be either blue or green. The three subpixels 218, 220, 222 are arranged along a direction that is different from the direction the common lines 212, 214 are extended length-wise.

The signal lines 224, 226, 228, 230 are arranged next to and/or between the subpixels 218, 220, 222. The signal line 224 is vertically in line with the common line 212, whereas the signal line 230 is vertically in line with the common line 214. That is, the signal line 224 overlaps with the common line 212 when viewed from the display surface side 204 to the rear surface side 208. Further, the signal line 230 overlaps with the common line 214 when viewed from the display surface side 204 to the rear surface side 208. However, there are no common lines that overlap with the signal lines 226, 228 next to the second subpixel 220 when viewed from the display surface side 204 to the rear surface side 208. Accordingly, light from the backlight (from the rear surface side 208) cannot be reflected back towards the signal lines 226, 228. This may reduce the possibility of light being reflected towards the display surface side 204 by the signal lines 226, 228. That is, the LCD device 200 can have homogeneous shading as a whole.

A common voltage can still be provided to the second subpixel 220 from one of the common lines 212, 214, so that an electric field can still be generated in the liquid crystal layer 210 of the second subpixel 220. This electric field is substantially parallel to the substrate in the liquid crystal layer 210, and thus, the electric field drives the liquid crystals in the subpixel 220 to control the transmission of light through the subpixel 220.

The gate line is formed of, for example, a metallic material such as aluminum (Al) and/or copper (Cu). The thickness of the gate line is, for example, 100 to 300 nm. On the upper portion of the gate line, the gate insulator film GAL is formed. As the gate insulting film GAL, for example, a silicon nitride SiN formed with a plasma chemical vapor deposition method (CVD) can be used. The gate insulator film GAL may also be formed of silicon dioxide $SiO_2$ or alumina $Al_2O_3$.

The semiconductor layer is processed into, for example, the shape of an island and is arranged above the gate line. As the semiconductor layer material of the semiconductor layer, for example, a combination of a silicon nitride SiN and amorphous silicon a-Si, a combination of silicon dioxide $SiO_2$ and an oxide semiconductor or a low-temperature poly-silicon LTPS can be used. For example, as the oxide semiconductor, an oxide of indium-gallium-zinc or the like can be used.

At the end portions of the semiconductor layer, the signal lines 224, 226, 228, 230 and the source electrode are formed. As the signal lines 224, 226, 228, 230 and the source electrode, for example, as described later, a low-resistant metallic material can be used, such as for example, aluminum Al or copper Cu. On the signal lines 224, 226, 228, 230 and the source electrode, the first passivation film PAS1 is formed. As the first passivation film PAS1, for example, a silicon nitride SiN or silicon dioxide $SiO_2$ can be used. The first passivation film PAS1 has a thickness of, for example, 200 to 400 nm.

The organic passivation layer OPAS is formed of, for example, a photosensitive resist material such as acrylic. Its thickness is, for example, 3 micro meters, and it is formed to be thicker than the other inorganic insulating layers.

There are overlaps of electrode portions on the opposed faces of the common electrode CIT and the pixel electrode PIT sandwiching the second passivation film PAS2 therebetween, and openings (slits) are formed in the pixel electrode PIT. The first alignment layer AL1 for aligning liquid crystal molecules of the liquid crystal layer 210 is formed between the liquid crystal layer 210 and the electrode layer of the common electrode CIT and the pixel electrode PIT.

The pixel electrode PIT and the common electrode CIT constitute an electrode portion for forming the fringe electric field in the liquid crystal layer 210.

The transparent pixel electrode PIT is connected to the source electrode vie a through-hole (not shown) formed in the first passivation film PAS1, the organic passivation layer OPAS and the second passivation film PAS2. With respect to the supply of the data voltage to the transparent pixel electrode PIT, when the on-voltage is applied to the gate line, the resistance of the semiconductor layer is lowered, and the data voltage is transmitted from one or more of the signal lines 224, 226, 228, 230 through the source electrode to the transparent pixel electrode PIT. By applying a voltage to the pixel electrode PIT, a predetermined potential difference corresponding to the modulation of transmittance of the liquid crystal of a pixel is imparted between the pixel electrode PIT and the common electrode CIT. The fringe electric field is generated in the vicinity of the openings in the pixel electrode PIT in the liquid crystal layer 210 by the potential difference, so that an alignment state of the liquid crystal molecules in the liquid crystal layer 210 is controlled so as to rotate the liquid crystal molecules in the substrate in-plane direction.

Figure 2:
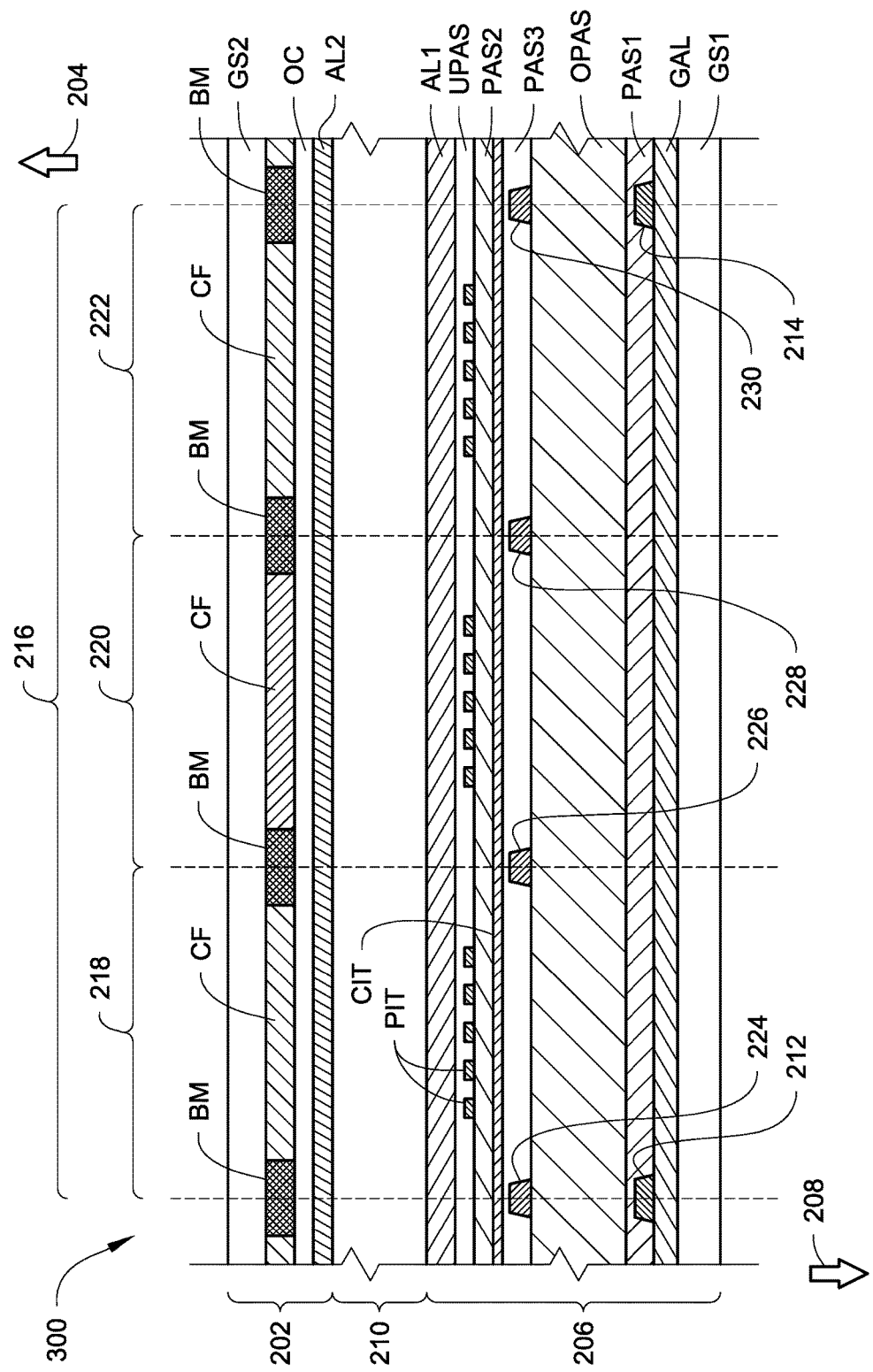
FIG. 2 is a schematic sectional side view of subpixels of a LCD device according to another embodiment.

The LCD device 200 has common lines 212, 214 positioned closer to the liquid crystal layer 210 than the signal lines 224, 226, 228, 230. Alternatively, the LCD device 300 shown in FIG. 2 has the signal lines 224, 226, 228, 230 positioned closer to the liquid crystal layer 210 than the common lines 212, 214. Otherwise, the elements of the LCD device 300 shown in FIG. 2 are same or similar to those of the LCD device 200 shown in FIG. 1. The LCD device 300 prevents the light from the backlight (from the rear surface side 208) from being reflected towards the display surface side 204 even when the light is reflected by the signal lines 226, 228, because there are no common lines that are vertically beneath the signal lines 226, 228 to reflect the reflected light form the signal lines 226, 228. This may reduce the possibility of light being reflected towards the display surface side 204 even when the light is reflected by the signal lines 226, 228. That is, the LCD device 200 can have homogeneous shading as a whole.

In comparison with FIG. 1, the relationship in position of the signal lines 224, 226, 228, 230 and the common lines 212, 214 is opposite. The signal lines 224, 226, 228, 230 are provided closer to the liquid crystal layer 210 than the common lines 212, 214. A third passivation layer PAS3 is formed between the common electrode CIT and the organic passivation layer OPAS. The third passivation layer PAS3 covers the signal lines 224, 226, 228, 230 formed on the organic passivation layer OPAS.

Figure 3:
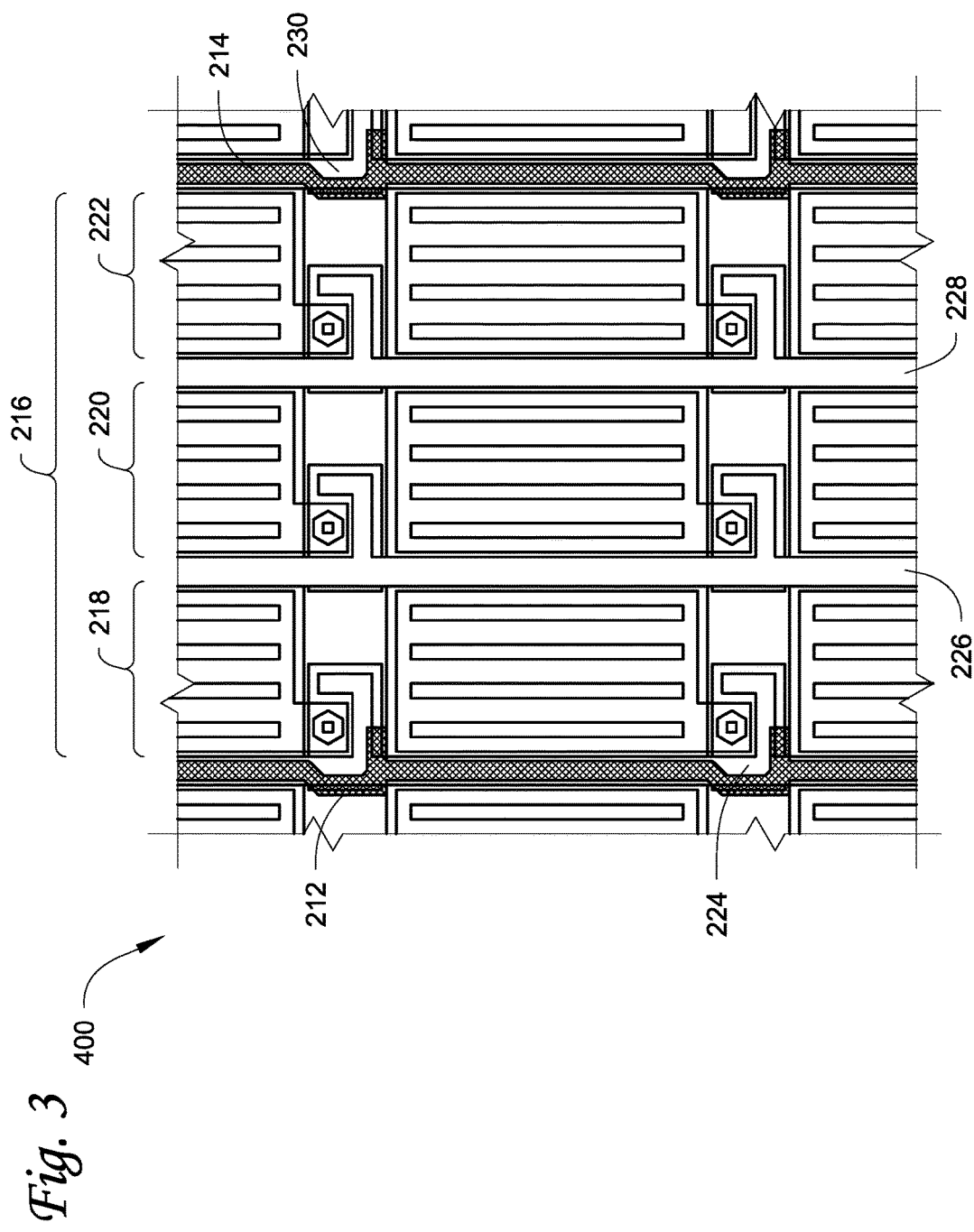
FIG. 3 is a schematic plan view of subpixels of a LCD device according to an embodiment.

FIG. 3 is a schematic plan view of pixels of a LCD device 400 (similar to 200 in FIG. 1 or 300 in FIG. 2). The signal lines 224, 226, 228, 230 are arranged next to and/or between the subpixels 218, 220, 222. The signal line 224 overlaps with the common line 212. Further, the signal line 230 overlaps with the common line 214. However, there are no common lines that overlap with the signal lines 226, 228 next to the second subpixel 220. In this embodiment, the second subpixel 220 is a red subpixel.

Figure 4:
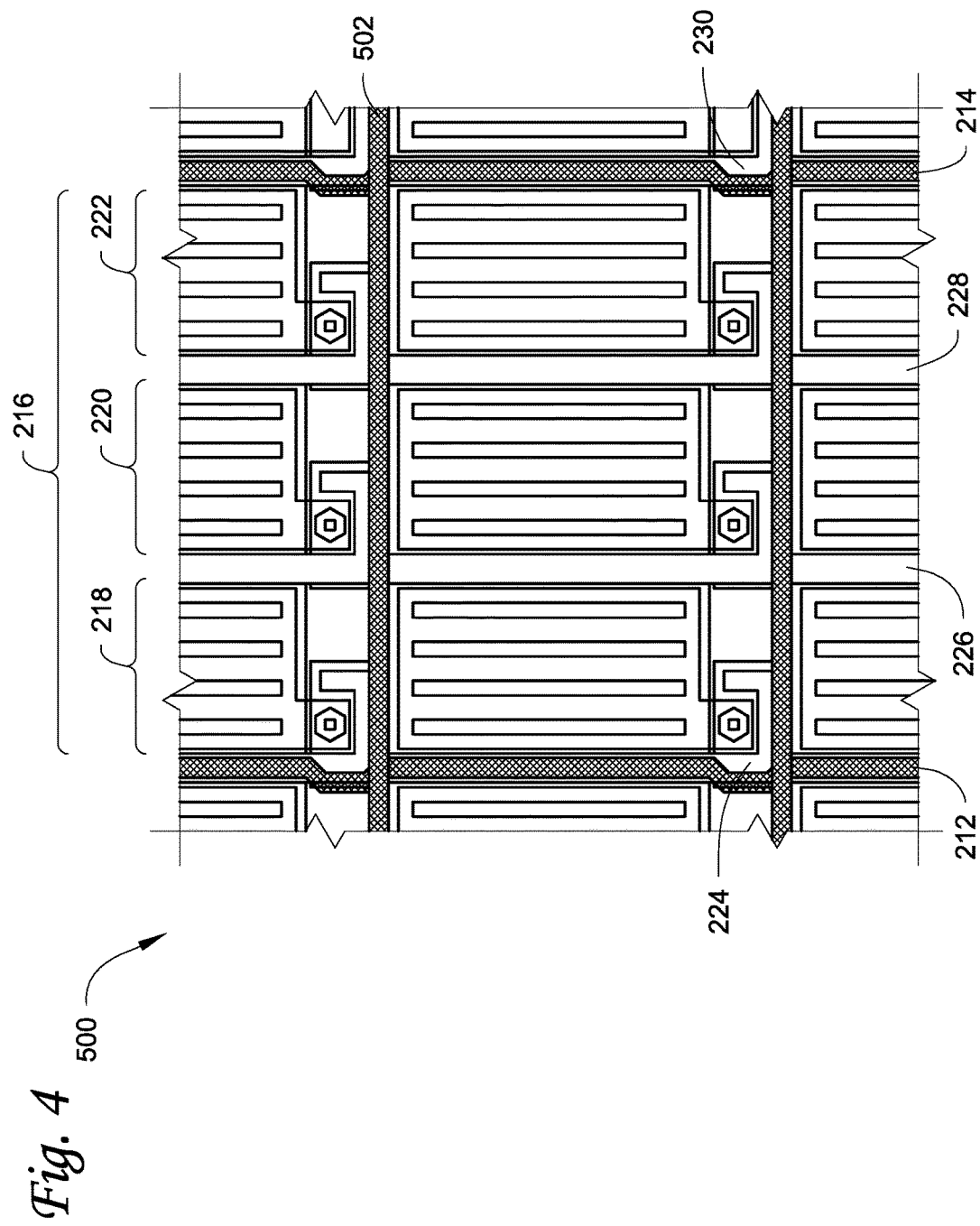
FIG. 4 is a schematic plan view of subpixels of a LCD device according to another embodiment.

FIG. 4 is a schematic plan view of pixels of a LCD device 500 according to another embodiment. Like the LCD device 400 shown in FIG. 3, the signal lines 224, 226, 228, 230 are arranged next to and/or between the subpixels 218, 220, 222. The signal line 224 overlaps with the common line 212. Further, the signal line 230 overlaps with the common line 214. Further, there are no common lines that overlap with the signal lines 226, 228 next to the second subpixel 220. The second subpixel 220 is a red subpixel. Further, the LCD device 500 includes another common line 502 which connects the two adjacent common lines 212, 214. This arrangement allows for improved delivery of common voltage common electrodes formed in to the second subpixel 220. For example, the another common line 502 can run along a direction that is substantially the same as the direction of arrangement of the three subpixels 218, 220, 222.

Figure 5:
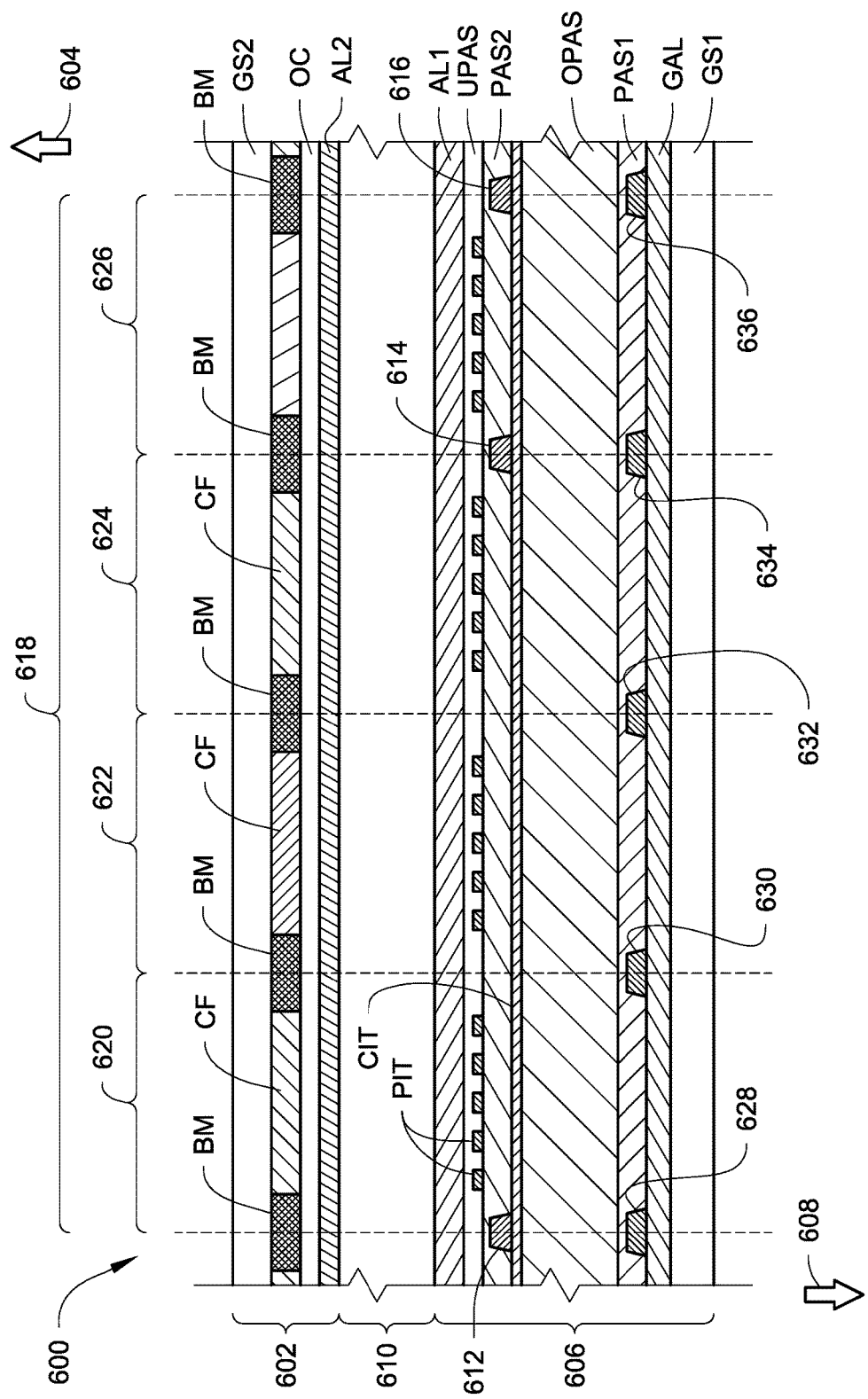
FIG. 5 is a schematic sectional side view of subpixels of a LCD device according to an embodiment.

FIG. 5 is a schematic sectional side view of pixels of a LCD device 600 according to another embodiment. The LCD device 600 can also be an IPS LCD device. The LCD device 600 includes a first substrate 602 on a display surface side 604, a second substrate 606 on a rear surface side 608, and a liquid crystal layer 610 interposed between the first substrate 602 and the second substrate 606. The LCD device 600 also includes at least three sequentially arranged common lines 612, 614, 616 along a first direction on the second substrate 606. The LCD device 600 includes a repeating arrangement of pixels 618. Each of the pixels 618 includes at least four subpixels, a first subpixel 620, a second subpixel 622, a third subpixel 624, and a fourth subpixel 626. At least three of the four subpixels 620, 622, 624 can be identified a respective color filter. For example, the first subpixel 620 can be either blue or green. The second subpixel 622 is red. For example, the third subpixel 624 can be either blue or green. The fourth subpixel 626 can be identified by a yellow color filter (thus being a yellow subpixel). The four subpixels 620, 622, 624, 626 are arranged along a direction that is different from the direction the common lines 612, 614, 616 are extended length-wise.

The signal lines 628, 630, 632, 634, 636 are arranged next to and/or between the subpixels 620, 622, 624, 626. The signal line 628 is vertically in line with the common line 612. The signal line 634 is vertically in line with the common line 614. The signal line 636 is vertically in line with the common line 616.

That is, the signal line 628 overlaps with the common line 612 when viewed from the display surface side 604 to the rear surface side 608. Further, the signal line 634 overlaps with the common line 614 when viewed from the display surface side 604 to the rear surface side 608. Furthermore, the signal line 636 overlaps with the common line 616 when viewed from the display surface side 604 to the rear surface side 608.

However, there are no common lines that overlap with the signal lines 630, 632 next to the second subpixel 622. Accordingly, light from the backlight (from the rear surface side 608) cannot be reflected back towards the signal lines 630, 632. This may reduce the possibility of light being reflected towards the display surface side 604 by the signal lines 630, 632. That is, the LCD device 600 can have homogeneous shading as a whole.

Figure 6:
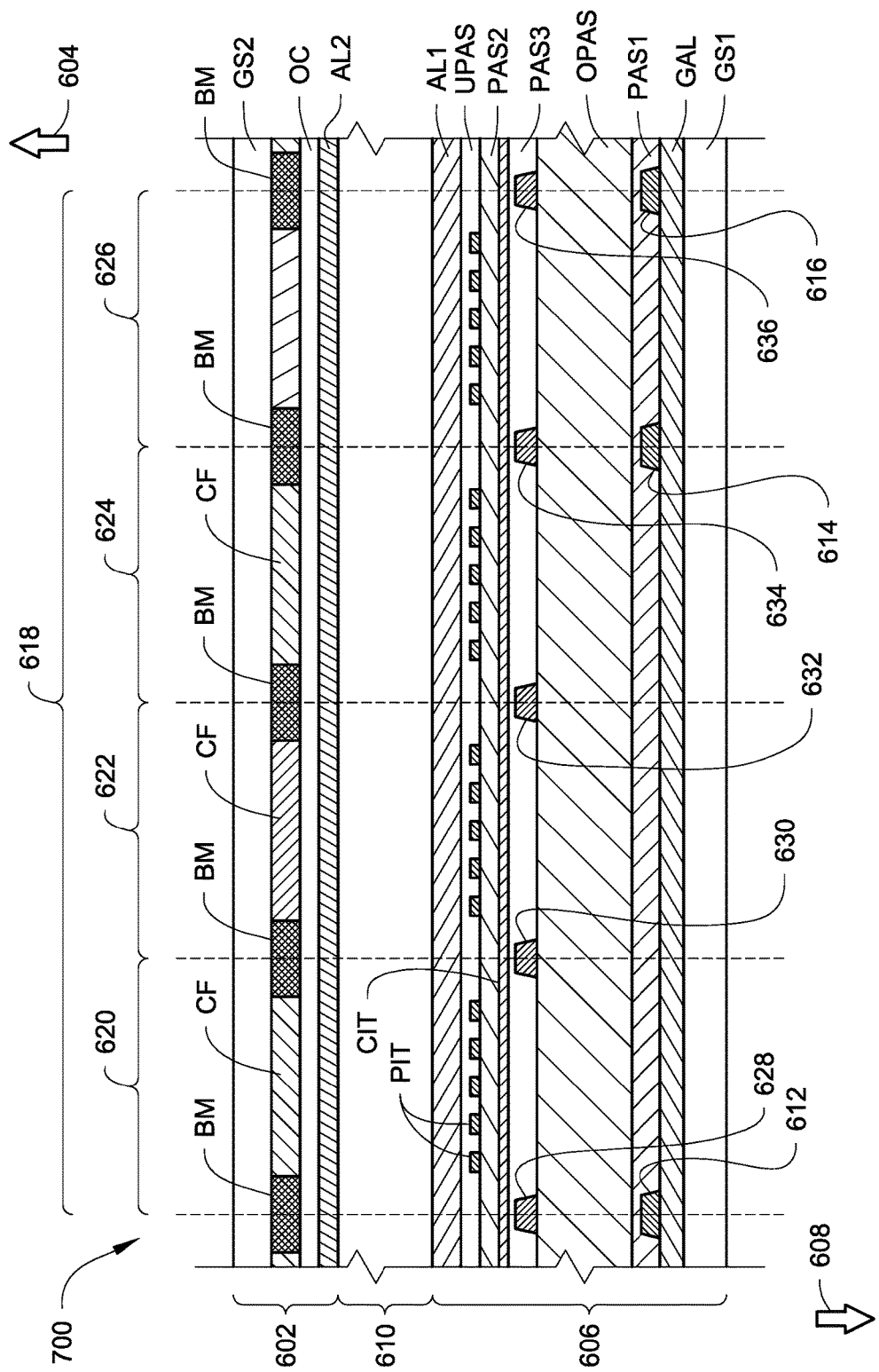
FIG. 6 is a schematic sectional side view of subpixels of a LCD device according to another embodiment.

The LCD device 600 has common lines 612, 614, 616 positioned closer to the liquid crystal layer 610 than the signal lines 628, 630, 632, 634, 636. Alternatively, the LCD device 700 shown in FIG. 6 has the signal lines 628, 630, 632, 634, 636 positioned closer to the liquid crystal layer 610 than the common lines 612, 614, 616. Otherwise, the elements of the LCD device 700 shown in FIG. 6 are same or similar to those of the LCD device 600 shown in FIG. 5. The LCD device 700 prevents the light from the backlight (from the rear surface side 208) from being reflected towards the display surface side 604 even when the light is reflected by the signal lines 630, 632, because there are no common lines that are vertically beneath the signal lines 630, 632 to reflect the reflected light form the signal lines 630, 632. This may reduce the possibility of light being reflected towards the display surface side 604 even when the light is reflected by the signal lines 630, 632. That is, the LCD device 700 can have homogeneous shading as a whole.

Figure 7:
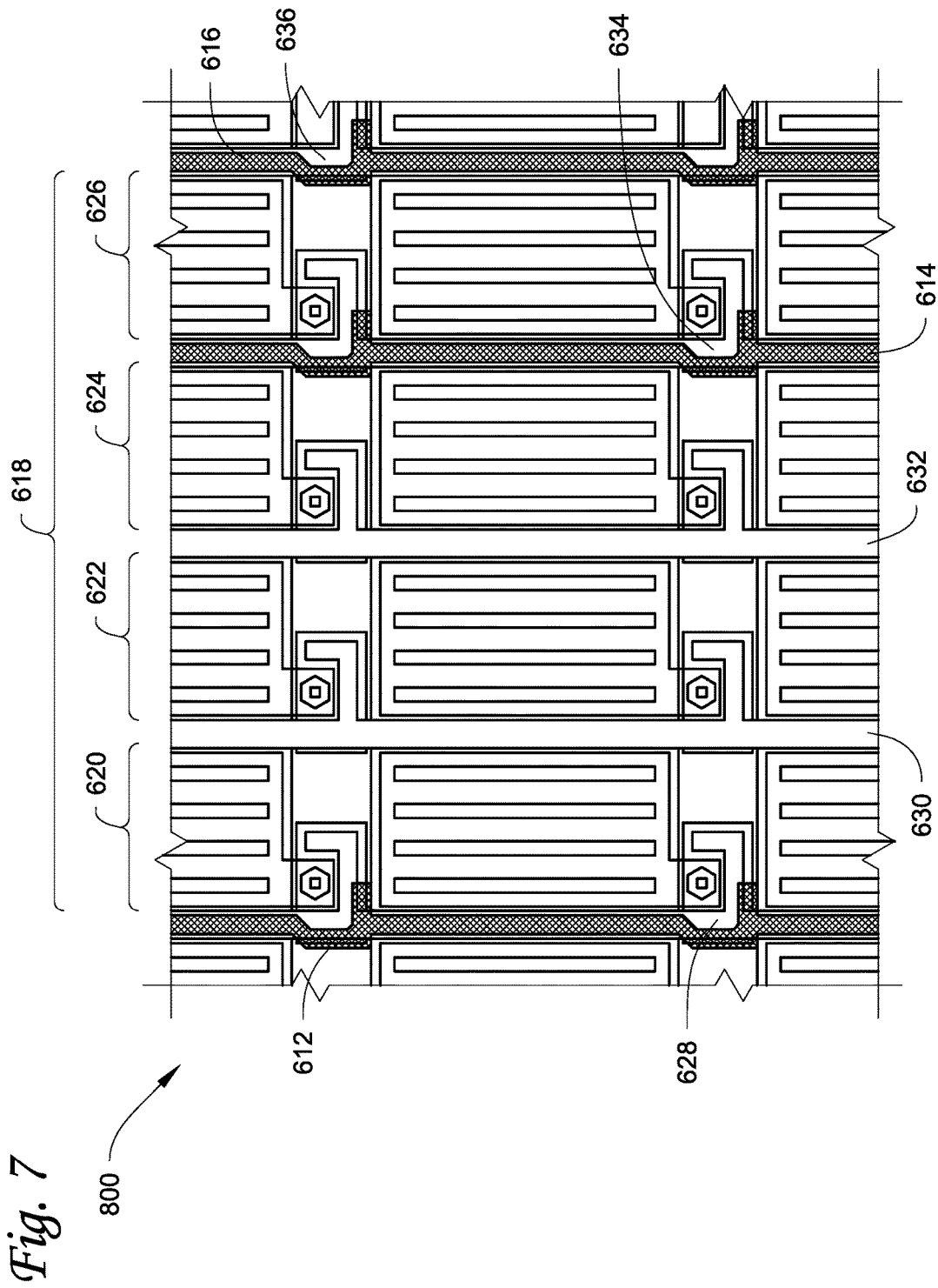
FIG. 7 is a schematic plan view of subpixels of a LCD device according to an embodiment.

FIG. 7 is a schematic plan view of pixels of a LCD device 800 (similar to 600 in FIG. 5 or 700 in FIG. 6). The signal lines 628, 630, 632, 634, 636 are arranged next to and/or between the subpixels 620, 622, 624, 626. In plan view, the signal line 628 overlaps with the common line 612, the signal line 634 overlaps with the common line 614, and the signal line 636 overlaps with the common line 616.

However, there are no common lines that overlap with the signal lines 630, 632 next to the second subpixel 622. In this embodiment, the second subpixel 622 is a red subpixel.

Figure 8:
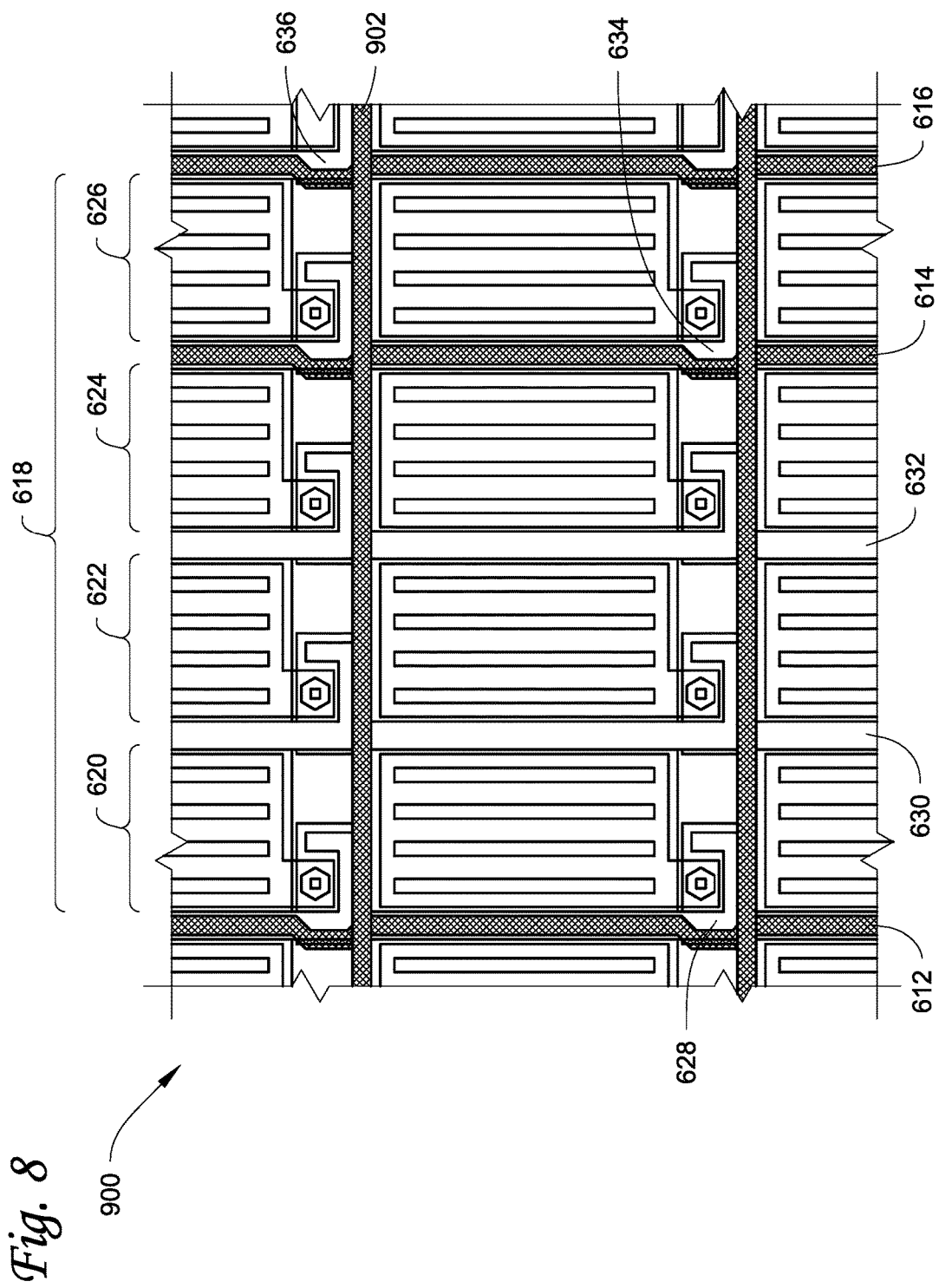
FIG. 8 is a schematic plan view of subpixels of a LCD device according to another embodiment.

FIG. 8 is a schematic plan view of pixels of a LCD device 900 according to another embodiment. Like the LCD device 800 shown in FIG. 7, the signal lines 628, 630, 632, 634, 636 are arranged next to and/or between the subpixels 620, 622, 624, 626. In plan view, the signal line 628 overlaps with the common line 612, the signal line 634 overlaps with the common line 614, and the signal line 636 overlaps with the common line 616. Further, the LCD device 900 includes another common line 902 which connects the adjacent common lines 612, 614. The common line 902 can also connect to the common line 616. This arrangement allows for improved delivery of common voltage to a common electrode formed in the second subpixel 622. For example, the another common line 902 can run along a direction that is substantially the same as the direction of arrangement of the four subpixels 620, 622, 624, 626.

The terminology used in this Specification is intended to describe particular embodiments and is not intended to be limiting. The terms "a," "an," and "the" include the plural forms as well, unless clearly indicated otherwise.

With regard to the preceding description, it is to be understood that changes may be made in detail, especially in matters of the construction materials employed and the shape, size, and arrangement of parts without departing from the scope of the present disclosure. The embodiments described are exemplary only. Other and further embodiments may be devised without departing from the basic scope thereof, with the true scope and spirit of the disclosure being indicated by the claims.

What is claimed is:

1. A liquid crystal display device, comprising:
 a first substrate on a display surface side;
 a second substrate on a rear surface side;
 a liquid crystal layer interposed between the first substrate and the second substrate;
 three common lines arranged along a first direction on the second substrate;
 a pixel including a red subpixel, a green subpixel, a blue subpixel, and another subpixel, wherein the red subpixel is arranged between the green subpixel and the blue subpixel along a second direction, and the red subpixel, the green subpixel, and the blue subpixel are interposed between first and second of the three common lines;

the another subpixel is interposed between second and third of the three common lines; and five signal lines arranged along the first direction on the second substrate, wherein each of the five signal lines is arranged adjacent to at least one of the red subpixel, the green subpixel, the blue subpixel, and the another subpixel in plan view, first of the three common lines overlaps a first of the five signal lines in plan view, second of the three common lines overlaps a fourth of the five signal lines in plan view, third of the three common lines overlaps a fifth of the five signal lines in plan view, and at least one of the three common lines or the five signal lines includes copper.

2. The liquid crystal display device according to claim 1, the another subpixel is a yellow subpixel.

3. The liquid crystal display device according to claim 1, wherein the red subpixel is not adjacent to any of the three common lines in plan view.

4. The liquid crystal display device according to claim 1, wherein the five signal lines are closer to the liquid crystal layer than the three common lines.

5. The liquid crystal display device according to claim 1, wherein the three common lines are closer to the liquid crystal layer than the five signal lines.

* * * * *